Sept. 26, 1950        R. H. GODDARD        2,523,654
FEEDING AND COOLING WALL STRUCTURE FOR COMBUSTION
CHAMBERS USING LIQUID COMBUSTION ELEMENTS
Filed Jan. 2, 1948        2 Sheets-Sheet 1
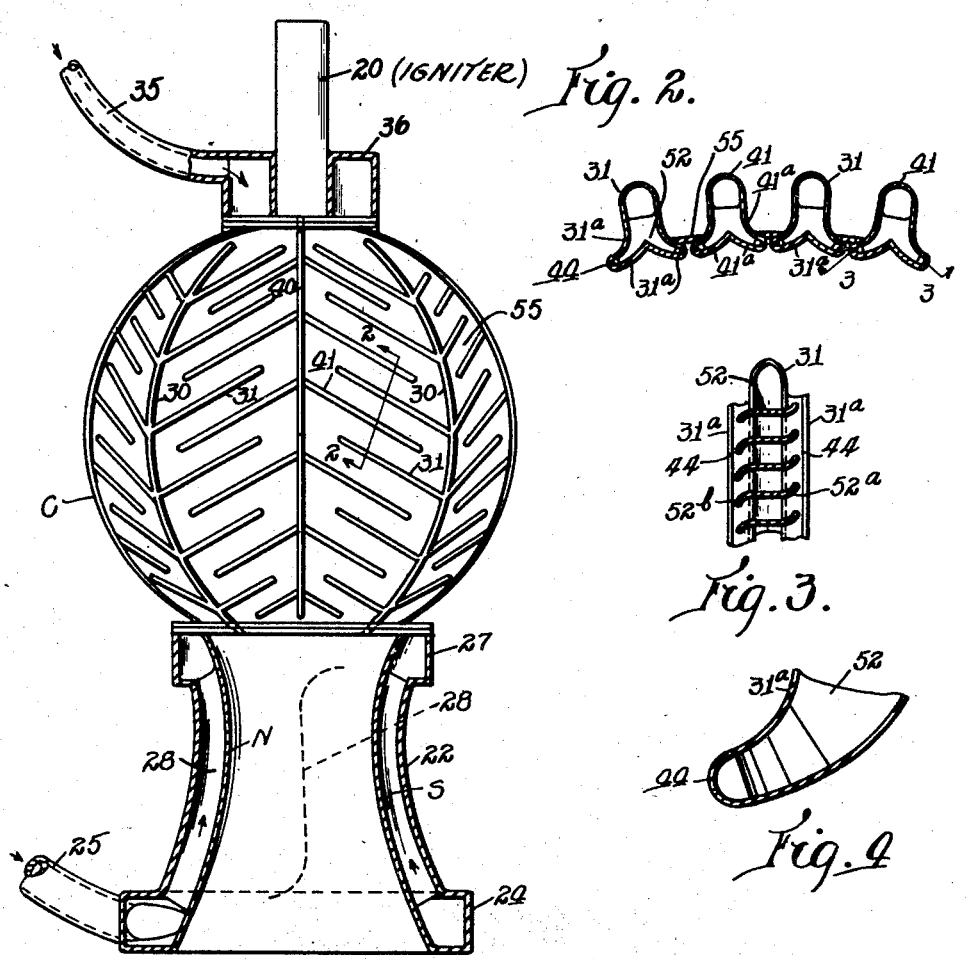
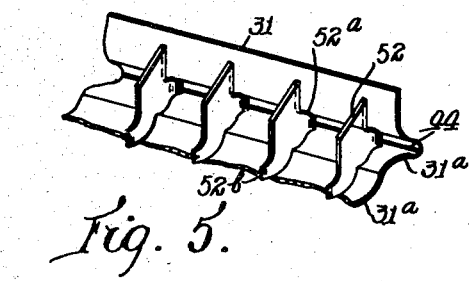
INVENTOR.
Robert H. Goddard, Dec'd.
Esther C. Goddard, Executrix
BY Chas. T. Hawley
ATTORNEYS.

Sept. 26, 1950            R. H. GODDARD            2,523,654
FEEDING AND COOLING WALL STRUCTURE FOR COMBUSTION
CHAMBERS USING LIQUID COMBUSTION ELEMENTS
Filed Jan. 2, 1948            2 Sheets-Sheet 2
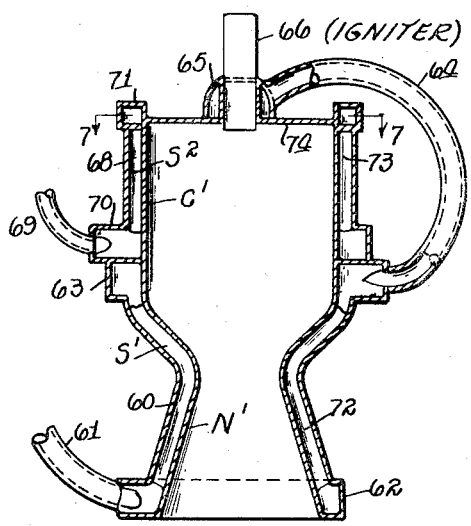
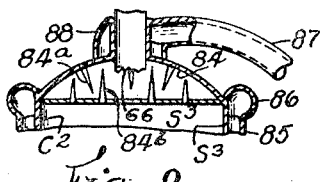
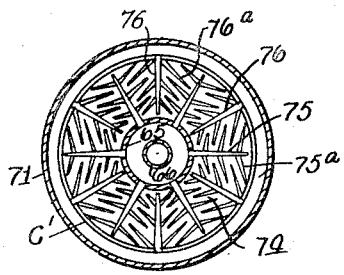
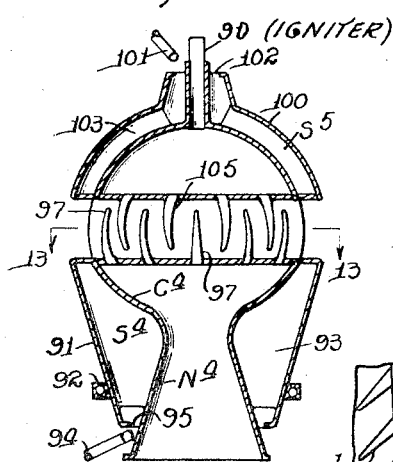
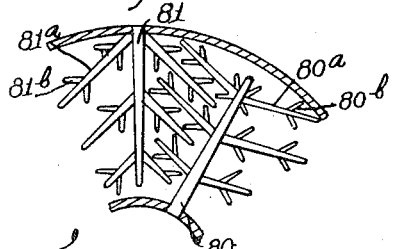
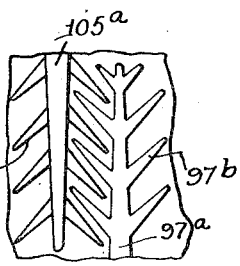
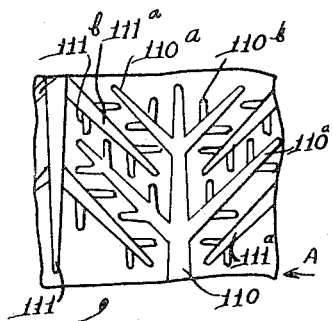
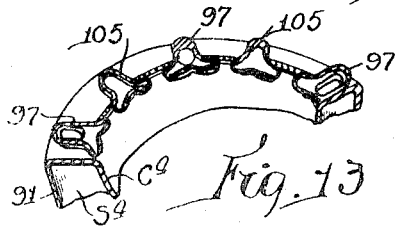
INVENTOR.
Robert H. Goddard, Dec'd.
Esther C. Goddard, Executrix.
BY Chas. T. Hawley
ATTORNEYS Patented Sept. 26, 1950

2,523,654

UNITED STATES PATENT OFFICE 2,523,654

FEEDING AND COOLING WALL STRUCTURE FOR COMBUSTION CHAMBERS USING LIQUID COMBUSTION ELEMENTS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application January 2, 1948, Serial No. 80

5 Claims. (Cl. 60—35.6)

This invention relates to combustion chambers of the general type commonly used in rockets and rocket craft.

It is essential that the wall of such a combustion chamber be made thin in order to save weight, but at the same time this wall must stand exposure to very high combustion temperatures. If gasoline and liquid oxygen are used as the combustion elements, the temperatures to which the wall is exposed are extremely severe.

It is the general object of this invention to provide improved feeding and cooling structure for such a combustion chamber, by which the wall of the chamber will be jacketed and cooled by the liquid combustion elements themselves and by which also very complete intermingling of the combustion elements is effected.

The invention further relates to arrangements and combinations of parts which will be hereinafter described and more particularly pointed out in the appended claims.

Preferred forms of the invention are shown in the drawings, in which

Fig. 1 is a side elevation of a combustion chamber, partly in section and showing one form of this invention;

Fig. 2 is an enlarged detail sectional view, taken along the line 2—2 in Fig. 1;

Fig. 3 is a detail sectional view, taken along the line 3—3 in Fig. 2;

Fig. 4 is an enlarged partial transverse section of a portion of one of the branch distributing ducts;

Fig. 5 is a detail perspective view of certain partition structure to be described;

Fig. 6 is a side elevation, partly in section, of a modified construction;

Fig. 7 is a plan view of the upper end of the combustion chamber, with certain parts in section;

Fig. 8 is a partial side elevation, partly in section and showing a further modification of the structure shown in Fig. 6;

Fig. 9 shows a modification of the structure shown in Fig. 7;

Fig. 10 is a side elevation, largely in section and showing a third form of the invention;

Figs. 11 and 12 each show modifications of the distributing duct structure shown in Fig. 10; and Fig. 13 is a partial sectional plan view, taken substantially along the line 13—13 in Fig. 10.

Referring to Figs. 1 to 5, a spherical combustion chamber C is provided with a rearward discharge nozzle N at one end and with an igniter 20 at the opposite end. The nozzle N has an outer casing member 22 which encloses a jacket space S.

A volute 24 is provided at the outer end of the nozzle N and tangentially receives a supply of a combustion liquid under pressure, as gasoline, from a supply pipe 25. The volute 24 communicates freely with the jacket space S, and the space S communicates at its upper end with a hollow ring 27.

Vanes or partitions 28 are provided in the space S. These vanes are curved at their upper and lower ends as indicated by the dotted line in Fig. 1, so that the direction of travel of the liquid is changed from circumferential to axial in the space S, and is again changed to circumferential as the liquid enters the ring 27, from which it is delivered to a series of meridian ducts 30 each having a plurality of branch ducts 31.

A second combustion liquid, as liquid oxygen, is supplied under pressure through a pipe 35 to a distributing ring 36 which surrounds the igniter 20. The liquid oxygen is distributed from this ring to an alternate series of meridian ducts 40 having branch ducts 41. The meridian ducts 30 and 40 and the branch ducts 31 and 41 are relatively so disposed that they comprise the major part of the spherical surface of the combustion chamber C.

Each branch duct 31 or 41 has the Y-shaped section shown in Fig. 2, with adjacent branch duct portions 31a and 41a directed toward each other and each provided with a narrow longitudinal slot or spray opening 44. Sprays of combustion elements are injected through these openings and are thereafter effectively intermingled.

In order to make this intermingling still more complete, partitions 52 are provided in the branch ducts 31 and 41, as indicated in Figs. 2, 3 and 5. These partitions are oppositely curved at their ends 52a and 52b as they enter the branch duct portions 31a and 41a, so that the two liquids enter the combustion chamber at opposite oblique angles as well as in opposed directions from any two adjacent branch duct portions 31a and 41a. This further facilitates effective intermingling of the two combustion liquids.

Baffle plates 55 (Fig. 2) are welded between adjacent ducts 30 and 40 and between adjacent branch ducts 31 and 41 to complete the wall of the combustion chamber C. These baffle plates 55 are screened from the hot combustion gases by the liquid sprays injected through the slots 44.

With this construction, all parts of the combustion chamber and nozzle are effectively liquid-cooled and the combustion liquids are most effectively intermingled.

In Figs. 6 and 7, a modified construction is shown involving a combustion chamber C' and a discharge nozzle N'. An outer casing member 60 encloses a jacket space S' which surrounds the nozzle N' and the adjacent portion of the side wall of the combustion chamber C'.

One combustion liquid, as gasoline, is fed through a supply pipe 61 to a volute 62, from which the gasoline is delivered to the jacket space S'. The gasoline is then delivered from the space S' to a second volute 63 which is connected by a pipe 64 to the space in a hollow cap 65 surrounding an ignition device 66.

An upper outer casing member 68 encloses a jacket space S2, to which a second combustion liquid, as liquid oxygen, is delivered through a pipe 69 and a volute 70. At its upper end, the jacket space S2 communicates with the space within a hollow ring 71.

Directing vanes 72 and 73 are provided in the jacket spaces S' and S2 and function to stiffen the casing members 60 and 68 and also to direct the combustion liquids. The vanes 72 and 73 are preferably oppositely curved at their two ends, as previously described for the vanes 28 in Fig. 1. They function in the same manner to change the centrifugal flow of the liquids in the volutes 62 and 70 to axial flow in the jacket spaces S' and S2, and again back to circumferential flow in the volute 63 and hollow ring 71.

The inner or upper end 74 of the combustion chamber C' comprises a plurality of outwardly radiating ducts 75 (Fig. 7) communicating at their inner ends with the space within the hollow cap 65, and a plurality of inwardly radiating ducts 76 communicating at their outer ends with the space within the hollow ring 71.

Each of these ducts 75 or 76 is provided with a plurality of branch ducts 75a or 76a which increase in length toward the periphery of the combustion chamber and which very effectively comprise the inner end wall 74 of the chamber C'.

The construction of the ducts with branched inner portions and longitudinal slots or spray openings may be as shown in Fig. 2 and as previously described. Baffle plates or strips are welded between adjacent branch ducts, also as shown in Fig. 2.

If the area of the inner end of the combustion chamber is increased, the double-branched construction shown in Fig. 9 may be substituted for the single-branched construction shown in Fig. 7.

In Fig. 9, the ducts 80 and 81 have branch ducts 80a and 81a, and these branch ducts in turn have sub-branches 80b and 81b. Otherwise the construction and operation is as previously described.

In Fig. 8, a further modification is shown, in which a combustion chamber C2 is constructed the same as the chamber C' in Fig. 6, except that the flat inner end 74 of the chamber C' is arched for greater strength, as indicated at 84 in Fig. 8. The arched end 84 is built up from inwardly and outwardly radiating ducts 84a and 84b in the same manner as shown in Fig. 7 and as previously described.

Fig. 8 shows a portion of a casing member 85 enclosing a jacket space S3 and communicating with a hollow ring 86 from which one combustion liquid is delivered to a plurality of inwardly radiating ducts. A supply pipe 87 and hollow cap 88 similarly deliver a second combustion liquid to the inner ends of a plurality of outwardly radiating ducts. The duct arrangement may be as shown in either Fig. 7 or Fig. 9.

In Figs. 10 to 13, an application of this invention to a rotating combustion chamber is disclosed. A substantially spherical combustion chamber C4 is provided with a discharge nozzle N4 and is rotatably supported at one end on an axially positioned igniter 90.

The nozzle N4 and the adjacent portion of the combustion chamber wall are surrounded by a casing member 91 enclosing a jacket space S4 having an external supporting bearing 92. Partitions 93 hold the nozzle N4 and casing member 91 in spaced relation and assist in rotating the combustion liquid in the space S4, which liquid is injected from the nozzle 94 through an annular opening 95. At its upper end, the jacket space S4 communicates with a plurality of upwardly extending ducts 97.

The upper or inner end of the chamber C4 is surrounded by a casing member 100 which encloses a jacket space S5 to which a second combustion liquid is delivered from a nozzle 101 through an annular opening 102. Radiating vanes 103 are provided in the jacket space S5, and the space S5 communicates at its lower end with a plurality of downwardly extending ducts 105.

The ducts 97 and 105 may be branched as shown in Fig. 11 at 97a, 97b, 105a and 105b.

For larger combustion chambers, the construction shown in Fig. 12 may be substituted, with ducts 110 and 111 provided with branch ducts 110a and 111a and with sub-branches 110b and 111b.

In all forms of the invention, efficient cooling and adequate fuel distribution and intermingling are satisfactorily provided.

Having thus described the invention and the advantages thereof, it will be understood that the invention is not to be limited to the details herein disclosed, otherwise than as set forth in the claims, but what is claimed is:

1. In a combustion chamber having a rearwardly-directed discharge nozzle and having a chamber wall structure comprising two oppositely directed series of hollow tubes, each having one or more spray openings, and metal plates closing the spaces between said adjacent tubes, that improvement which comprises providing means to supply two different combustion liquids under pressure to said two series of spray tubes and in forming each spray tube with a main portion and with a plurality of diverging and radiating branches, the branches of said two series being alternately disposed in intimate relation, and in providing each spray tube with a plurality of openings through which the combustion liquids are sprayed into said combustion chamber.

2. In a combustion chamber having a rearwardly directed discharge nozzle and having a chamber wall structure comprising two oppositely directed series of hollow tubes, each having one or more spray openings, and metal plates closing the spaces between said adjacent tubes, that improvement which comprises providing means to supply two different combustion liquids under pressure to said two series of spray tubes and in forming each spray tube with a main portion and with a plurality of diverging and radiating branches, the branches of said two series being alternately disposed in intimate relation, and in providing each of said spray tubes with longitudinal slots through which elongated sprays of combustion liquids may be fed to said combustion chamber.

3. In a combustion chamber having a rearwardly-directed discharge nozzle and having a chamber wall structure comprising two oppositely-directed series of hollow tubes, each having one or more spray openings, and metal plates closing the spaces between said adjacent tubes, that improvement which comprises providing means to supply two different combustion liquids under pressure to said two series of spray tubes and in forming each spray tube with an inverted Y section, and in providing the two leg portions of each Y section with oppositely-directed spray openings in their outer edge portions.

4. The combination in a combustion chamber as set forth in claim 3, in which a plurality of transverse partitions are provided in each spray tube, and in which the end portions of each partition extend into said leg portions and are oppositely curved therein.

5. In a combustion chamber having a rearwardly-directed discharge nozzle and having a chamber wall structure comprising two oppositely directed series of hollow tubes, each having one or more spray openings, and metal plates closing the spaces between said adjacent tubes, that improvement which comprises forming the combustion chamber in substantially spherical shape, and enclosing the end portions of the combustion chamber by jacket spaces supplied with two different liquids under pressure, and forming the middle portion of the combustion chamber wall with oppositely directed and alternately disposed series of spray tubes and connecting plates, and providing each series of tubes with a combustion liquid under pressure from one of said jacket spaces.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 2,217,649 | Goddard | Oct. 8, 1940 |
| 2,396,567 | Goddard | Mar. 12, 1946 |
| 2,397,834 | Bowman | Apr. 2, 1946 |

FOREIGN PATENTS

| Number | Country | Date |
|---|---|---|
| 376,974 | Great Britain | July 1, 1932 |